(12) United States Patent
Jakob

(10) Patent No.: US 7,980,979 B2
(45) Date of Patent: Jul. 19, 2011

(54) CONVEYOR BELT JUNCTION ELEMENT

(75) Inventor: Horst Jakob, Deaux (FR)

(73) Assignee: Aser

( * ) Notice: Subject to any disclaimer, the term of this patent is extended or adjusted under 35 U.S.C. 154(b) by 685 days.

(21) Appl. No.: 10/593,112

(22) PCT Filed: Mar. 17, 2005

(86) PCT No.: PCT/FR2005/000654
§ 371 (c)(1),
(2), (4) Date: Apr. 22, 2008

(87) PCT Pub. No.: WO2005/093287
PCT Pub. Date: Oct. 6, 2005

(65) Prior Publication Data
US 2008/0207370 A1 Aug. 28, 2008

(30) Foreign Application Priority Data

Mar. 18, 2004 (FR) ...................................... 04 02888

(51) Int. Cl.
*F16G 3/00* (2006.01)
(52) U.S. Cl. ...... 474/253; 474/255; 474/257; 198/844.2
(58) Field of Classification Search .................. 474/253, 474/255, 257; 198/844.2; 24/33 V, 33 I, 24/37–38
See application file for complete search history.

(56) References Cited

U.S. PATENT DOCUMENTS

| | | | | |
|---|---|---|---|---|
| 206,556 A | * | 7/1878 | Gingras | .......................... 474/255 |
| 1,792,718 A | | 2/1931 | Stoll | |
| 2,446,311 A | * | 8/1948 | Traxler | .......................... 474/257 |

(Continued)

FOREIGN PATENT DOCUMENTS

FR 1140516 7/1957

(Continued)

*Primary Examiner* — Sang Kim
(74) *Attorney, Agent, or Firm* — Blank Rome LLP

(57) ABSTRACT

A junction for a conveyor belt that includes first and second half-junctions attachable to one end of the conveyor belt. Each of the half-junctions having substantially matching shapes that allow the half-junctions to be interlinked. The half-junctions include a flexible core, and being respectively equipped with cup inserts and bush inserts allowing the passage of an assembly mechanism. Each of the cores extend towards the inside of each half-junction forming a fold at a free edge of each of the half-junctions. The top level of the first half-junction contains the fold and in which a front edge of the bottom level has substantially the same shape as a front edge of the top level, but is shifted towards the rear at least by the distance that separates the front edge of the top level from the cup inserts that are the furthest from the front edge of the top level. The second half-junction has a top level in which the shape of a front edge of the top level matches that of the front edge of the matching first half-junction, and a bottom level containing the fold and the bush inserts. The front edge of the bottom level is shifted towards the front in relation to the front edge of the top level, and its shape matches that of the front edge of the bottom level of the first half-junction. The attachment of the first and second half-junctions with each other is provided by fasteners.

15 Claims, 14 Drawing Sheets

U.S. PATENT DOCUMENTS

| | | | |
|---|---|---|---|
| 4,558,492 A * | 12/1985 | Hite et al. ........................ 24/37 |
| 5,724,706 A | 3/1998 | Jakob |
| 5,839,571 A | 11/1998 | Jakob |
| 6,131,728 A * | 10/2000 | Rizhanovsky ............. 198/844.2 |
| 6,601,698 B2 | 8/2003 | Jakob |
| 7,344,020 B2 * | 3/2008 | Grywacheski et al. ..... 198/844.2 |

FOREIGN PATENT DOCUMENTS

| | | |
|---|---|---|
| GB | 548209 | 9/1942 |
| GB | 708461 | 5/1954 |

* cited by examiner

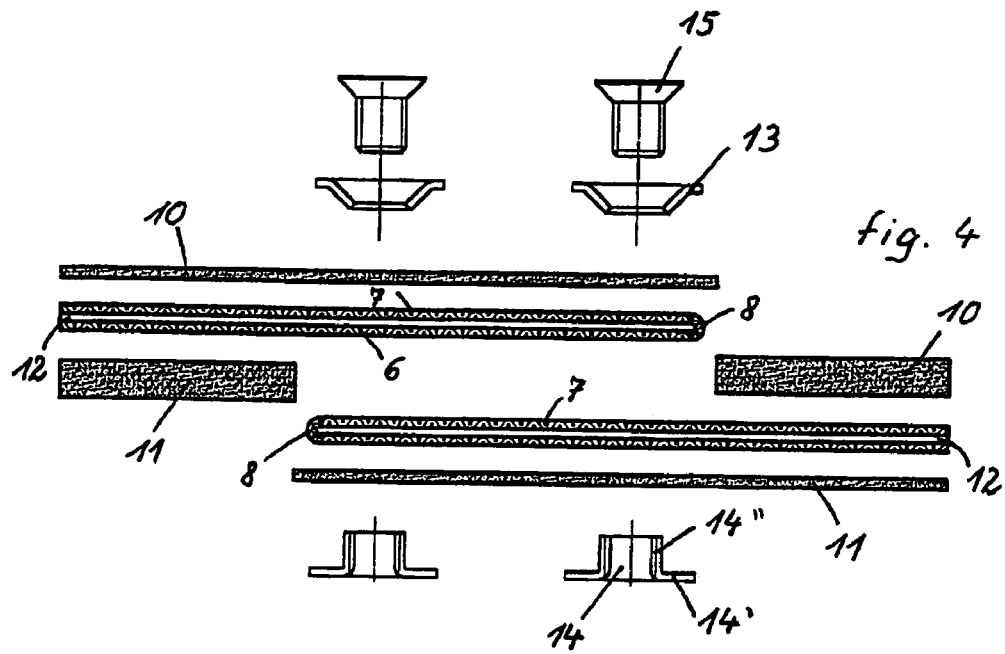
fig. 4
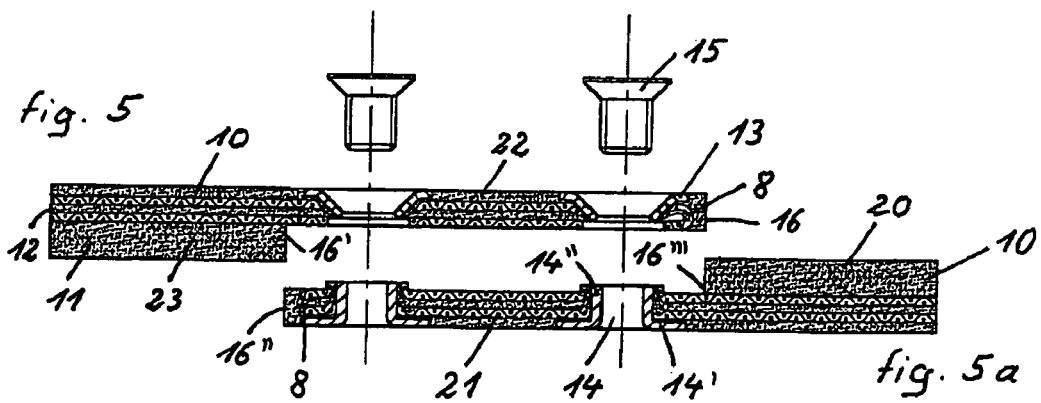
fig. 5
fig. 5a
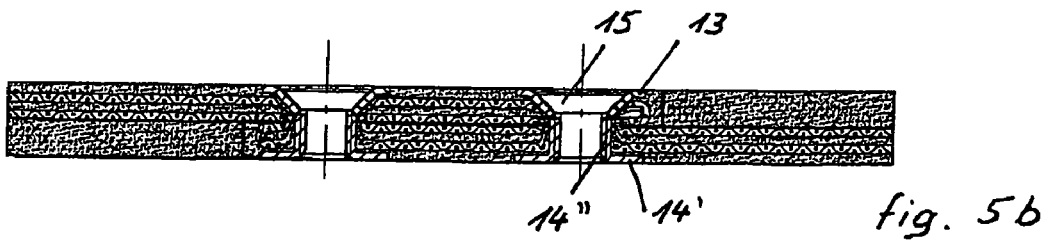
fig. 5b

CONVEYOR BELT JUNCTION ELEMENT

FIELD OF THE INVENTION

The present invention relates to a junction element built into the ends of a conveyor belt.

BACKGROUND OF THE INVENTION

Conveyor belts have been known for a long time, generally made from rubber or a synthetic material and comprising a flexible inner core.

Various methods have been used in the past to provide the junction between the ends of a conveyor belt that is initially open at both ends, with a view to transforming it into a so-called endless operational conveyor belt. These junction methods are also used for the insertion of new sections in a current conveyor belt, with a view to extending the length of said current belt, for example to follow-up the progress of mining work or to replace a part of the conveyor belt that has been damaged.

Notable among these methods is the vulcanisation of the ends, with a prior operation of baring the core and forming degrees with shapes that complement the two ends of the conveyor belt. Vulcanisation provides excellent results, but it has the disadvantage of the time required to perform it, taking up to 24 hours, which is a definite handicap.

Another method used is gluing with technical glues. As with vulcanisation, it requires a great deal of care to be taken as regards the preparation of the ends, and great rigour as regards the conditions under which the technical glues are applied.

Metal clips mounted on the ends of the conveyor belt and connected to each other by means of a linking and hinging rod passing through the knuckles of the metal clips, mounted on the edge of the ends of the conveyor belt, are another well known method used for joining the ends of conveyor belts. However, this device has problems caused by the wear of the clips and of the linking rods as well as by localised wrenching, which require repairs and increased stopping times of the conveyor belts.

New types of junctions have furthermore been suggested by the applicant of the present application. These junctions are described in detail, for example, in U.S. Pat. Nos. 5,839,571 and 6,601,698. Express reference is made to these patents. In short, these junctions consist of reinforced junction elements made from rubber or synthetic materials, with a general H shape, extending around the ends of the conveyor belt, on either side of the central section of the generally H-shaped junction, one of the flanges having pre-punched holes equipped with cup inserts, and the other flange having pre-punched holes equipped with bush inserts. These holes equipped with cups are placed in staggered rows over quite a large surface in order best to distribute the traction efforts to which the flanges of the junction and the conveyor belt are subjected.

These H-shaped junctions, screwed in the perpendicular direction of the general plane of the junctions, described in U.S. Pat. No. 6,601,698 B2, have turned out to be excellent as far as their strength is concerned.

In addition, it is possible to remove screwed junctions of this type, which allows easy replacement of a damaged section of the conveyor belt, or to extend the length of the conveyor belt with a view to following up the progress of mining work, for example.

However, these junctions, which have solved many problems in certain industries, in particular in heavy extraction industries, for transporting coal, minerals, phosphates and other heavy loose products, still encounter, in certain cases, problems with wrenching of the flanges which, although they are bevelled in the direction of the thickness at the end that is in contact with the conveyor belt, have a thickness that sometimes catches with the scrapers with which these belts are equipped.

Finally, it is desirable to have, for example in order to replace conveyor belts of a given machine of standard model and length, for example in roadworks, earthworks, farming work and similar work, conveyor belts with ends that are prepared for being quickly and easily connected.

Past patent applications have already proposed conveyor belts equipped at their ends with half-junctions with matching shapes. The patents of the prior art GB-A-548 209 by the Dunlop Rubber Company Limited, GB-A-708 461 by Cable Belt Limited and FR-A-1 140 516 by the Dunlop Rubber Company Limited can be mentioned as an example of this.

However, the junction devices provided in these patents of the prior art were difficult to implement and the handling of the ends of the conveyor belt in order to present them for mutual attachment was very complex. Moreover, the attachment means, slats or rods passing through the transverse holes alternately belonging to either one of the ends of the conveyor belt were very difficult to install, in particular in the heavy conveyor belts. Finally, the resistance to traction of these junctions with transverse slats was not satisfactory. Indeed, the transverse slats or rods caused shearing effects in the constituent material, present between the two layers of core placed respectively above and under the transverse holes, which resulted in wear and tear of the junctions.

SUMMARY OF THE INVENTION

The problem thus posed is resolved according to the invention by means of a junction for a conveyor belt, consisting of two half-junctions, made from vulcanised rubber or a plastic material, each solidly attached respectively to one end of the conveyor belt, the half-junctions having a generally flat shape and a maximum thickness that is equal to or slightly less than that of the end of the conveyor belt with which it is solidly attached and having matching shapes that allow them to be interlinked such as to form a junction with a thickness that is at most equal to that of the ends of the conveyor belt, said two half-junctions comprising a flexible core, textile or otherwise, and being respectively equipped with cup inserts and bush inserts allowing the passage of assembly means, of the rod type, arranged perpendicularly to the general plane of the junction, characterised in that the solid attachment of each of the two half-junctions with the corresponding conveyor belt end is provided, on the one hand, by means of the continuity of the constituent material of the end and of the half-junction and, on the other hand, by flexible cores, textile or otherwise, of the corresponding ends of the conveyor belt, each of the cores extending towards the inside of each half-junction forming a fold of the side of the free edge, or front edge of each of the half-junctions, next to said free edge, the core sections thus folded extending at least beyond the bush insert that is furthest from the section of the front edge that is longitudinally in line with said bush insert, the male half-junctions comprising two levels, a top level and a bottom level, the top level containing the folded core and the bottom level only comprising the constituent material, in which the front edge has substantially the same shape as the front edge of the top level, but is shifted towards the rear at least by the distance that separates the front edge from the cup inserts that are the furthest from the front edge, and the female half-junctions comprising two levels, a top level that only comprises the constituent material and in which the shape of the front edge matches that of the front edge of the matching male half-junctions, and a bottom level containing the folded core and the bush inserts, in which the front edge is shifted towards the front in relation to the front edge of the top level, its shape matching that of the front edge of the male half-junction, the solid attachment of the male and female half-junctions with each other is provided by rod fasteners, such as rivets or studs, but preferably by means of screws, in which the head rests against the bottom of the cup inserts and in which the thread is screwed into the relevant bush inserts, which are threaded on the inside or smooth in the case that self-tapping screws are used, with neither the heads of the screws nor their opposite ends sticking out beyond the outside surfaces of the half-junctions at the points where the screws are inserted.

The following description conventions have been adopted for the description of the present invention, but it is evident that it would also have been possible to use the opposite conventions, for example top and front replacing bottom and rear, according to the position of observation in relation to the objects described or the presentation of the objects described in relation to the observer. This is why the description conventions are mentioned here. In the present description and in the appended claims, front refers to the free side of each of the half-junctions, rear meaning the side connected to the relevant end of the conveyor belt, top level means the level that is next to the part of the conveyor belt which receives the material or objects to be transported, bottom level means the level that is next to the part of the conveyor belt that is in contact with the driving rollers and the idler rollers. Male applies to the half-junctions that comprise cup inserts and female applies to the half-junctions that comprise bush inserts. Longitudinal refers to the longitudinal direction of the conveyor belt, transverse refers to the direction that is perpendicular to the longitudinal direction of the conveyor belt to which the half-junctions are connected or will be connected, regardless of the relative dimensions of the half-junction sections to which these adjectives are applied.

It should be noted that, through application of the preceding, while in all the examples shown below in the drawings, the screws and the cup inserts of the male half-junction are located opposite the conveyor belt, it is also possible to set them up them the other way round, the male section (and therefore its screws and cup inserts) being located on the side of the conveyor belt.

It should be noted that the term "end of conveyor belt" used in the present description does not necessarily refer to the end of a conveyor belt that already exists when the half-junctions are in the manufacturing stage. It can refer, as shown below, to the "end of conveyor belt" comprising all the elements of a conveyor belt (constituent material surrounding a flexible core on either side thereof and solidly attached thereto by means, for example, of vulcanisation) but that is very short, which is designed for being connected, for example by vulcanisation, according to well known methods, to a conveyor belt with a length chosen during a later manufacturing stage, or even on the premises of the user, with a view to preparing a replacement of a conveyor belt, or an extension of a conveyor belt while it is still in service, its effective assembly on a conveyor device therefore being possible in a very short period of time compared with vulcanisation carried out on a conveyor belt that needs to be stopped. Evidently, in many cases, for example in cases in which the conveyor belt is of standard length (machines for rolling hay or straw, roadwork machines, etc.), the "end of the conveyor belt" on which the half-junction according to the invention is installed according to the invention is that of a very long band and not that of a very short section as mentioned above. In many cases, the moulding of the half-junction is carried out at the same time as the moulding of the actual conveyor belt, the constituent materials and the core being the same in the conveyor belt and in the half-junctions installed on either one of the ends thereof.

According to an advantageous improvement of the invention which provides increased strength to the half-junctions, the junction is characterised in that the bush inserts are made in the female half-junctions so that the bush drives the edges of the hole of the two sections of the core that surround the bush perpendicularly in the general plane of these layers and are therefore solidly attached to the female half-junction in two perpendicular planes by the constituent material and the sections of the core that surround them.

According to a further development, the junction is characterised in that the bush inserts comprise a section forming a flat flange that is solidly attached to the actual bush section and is arranged perpendicularly to the end of the bush that is the closest to the outside surface of the bottom level of the matching female half-junction, and is only separated from this surface by a thin layer of the constituent material, these flanges extending in a plane that is parallel to the general plane of the half-junction and being solidly attached to the constituent material that surrounds them.

As regards the cup inserts, it is advantageous that the cup inserts are made in the male half-junctions so that the cup rests closely, by its sections that border the central hole, against the edges of the hole made in two sections of the core, with which it is solidly attached by the surrounding constituent material.

Several shapes of the front edges of the top and bottom levels of the male and female half-junctions are possible without departing from the context of the invention. Among these shapes are junctions in which the front edge of the top level of the male half-junction consists of a succession of front edge sections perpendicular to the longitudinal direction of the male half-junction, separated from each other in the longitudinal direction and front edge sections that extend longitudinally, each of these front edge sections perpendicular to the longitudinal direction being connected to the closest front edge section or sections that is/are perpendicular to the longitudinal direction shifted towards the rear by front edge sections that are parallel to the longitudinal direction, thus forming a broken line, the shapes of the front edge of the bottom level of the male half-junction, of the front edge of the top level of the female half-junction and of the front edge of the bottom level of the female half-junction resulting, as defined above, from the shape of the front edge of the top level of the male half-junction, the core being slit longitudinally over the distances required to form shifted folds and the shifted folded sections corresponding to the shifted front edge sections. We can also mention the junctions in which the front edge is presented in the form of broken lines organised according to different modes explained below in relation with embodiments indicated by way of example, the general aim being not to present the front edges that extend over considerable distance to the scrapers, since said edges could catch with the scrapers, which is contrary to one of the main aims of this invention. A negative example such as this will be provided below in relation to the explanations regarding one drawing of such an example.

Better still, front edges that only have oblique lines in relation to the longitudinal direction are at even less risk of catching with the scrapers. Examples of this will be seen in the embodiments of the invention described below.

As shown in other examples, the applicant has also studied the front edge shapes in which it is quite straightforward to form folds of the core, while striving to achieve a shape that will not catch with the scrapers.

On this subject, it should be remembered, bearing in mind that, as mentioned above, one aim of the invention is for the thickness of the interlinked and assembled half-junctions not to exceed the thickness of the associated conveyor belt ends, that in theory the scrapers should not catch with the front edges of the half-junctions. However, minimal movements of the top levels of the half-junctions are possible during operation, which is why the choice of shapes such as those studied by the applicant is important to prevent giving the scrapers a hold, small as it may be.

BRIEF DESCRIPTION OF THE DRAWINGS

Particularly advantageous embodiments of the invention are presented in the drawings, in which:

FIG. 4 shows, in a longitudinal section view and in a diagrammatic fashion, the elements that make up two half-junctions according to the invention, FIG. 5 shows, in a longitudinal section view and in a diagrammatic fashion, the elements that make up two half-junctions according to the invention, in different stages of insertion (FIG. 5*a*) of the elements and of assembly of the two half-junctions (FIG. 5*b*)

DETAILED DESCRIPTION OF THE EXEMPLARY EMBODIMENTS

Figure 1:
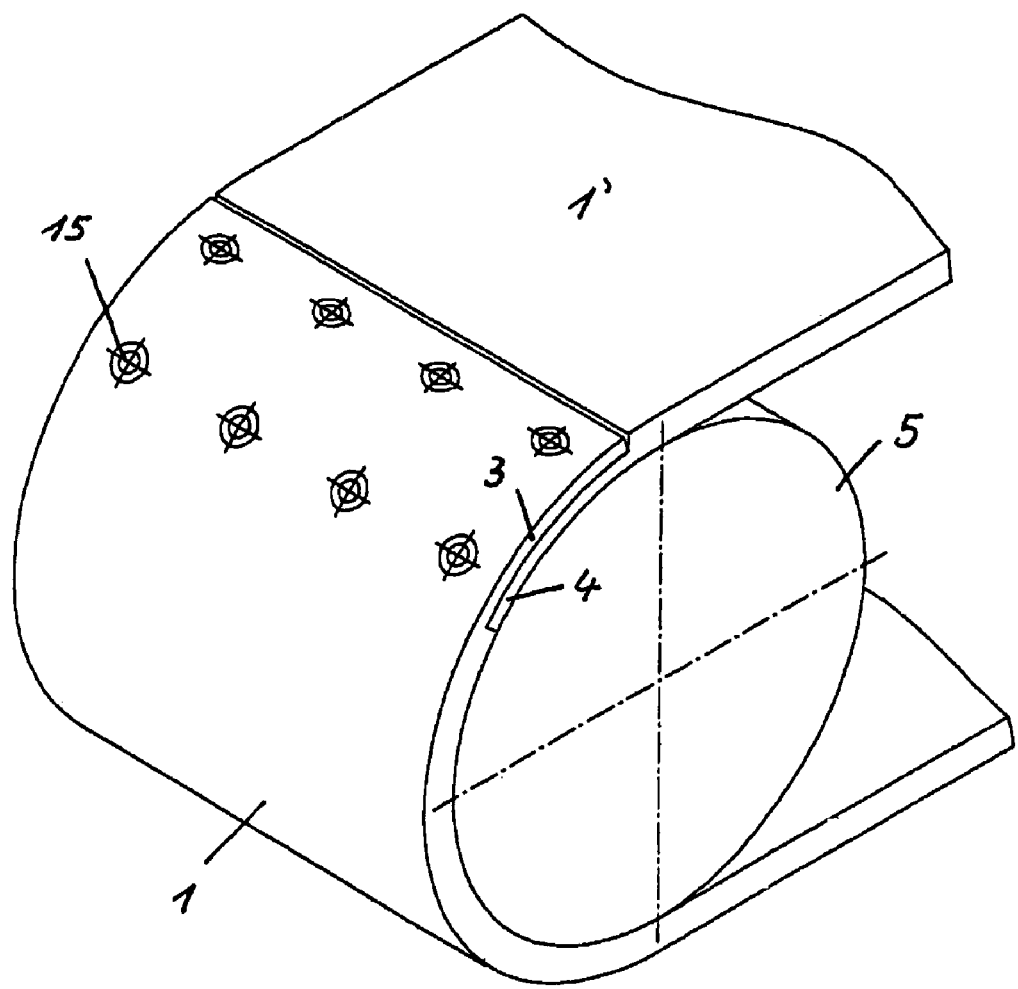
FIG. 1 shows a perspective view of an embodiment of a junction according to the invention of the ends of a conveyor belt, in place on a driving roller.

In FIG. 1, a roller 5 is used for driving the ends 1, 1' of the conveyor belt, notably comprising a male half-junction 3 and a female half-junction 4 assembled by means of screws 15. This junction only shows the general principle of the junctions according to the invention since, as already mentioned above, it has a front section of the male half-junction 3 which extends across the entire width and which can therefore catch easily with the scrapers.

Figure 2:
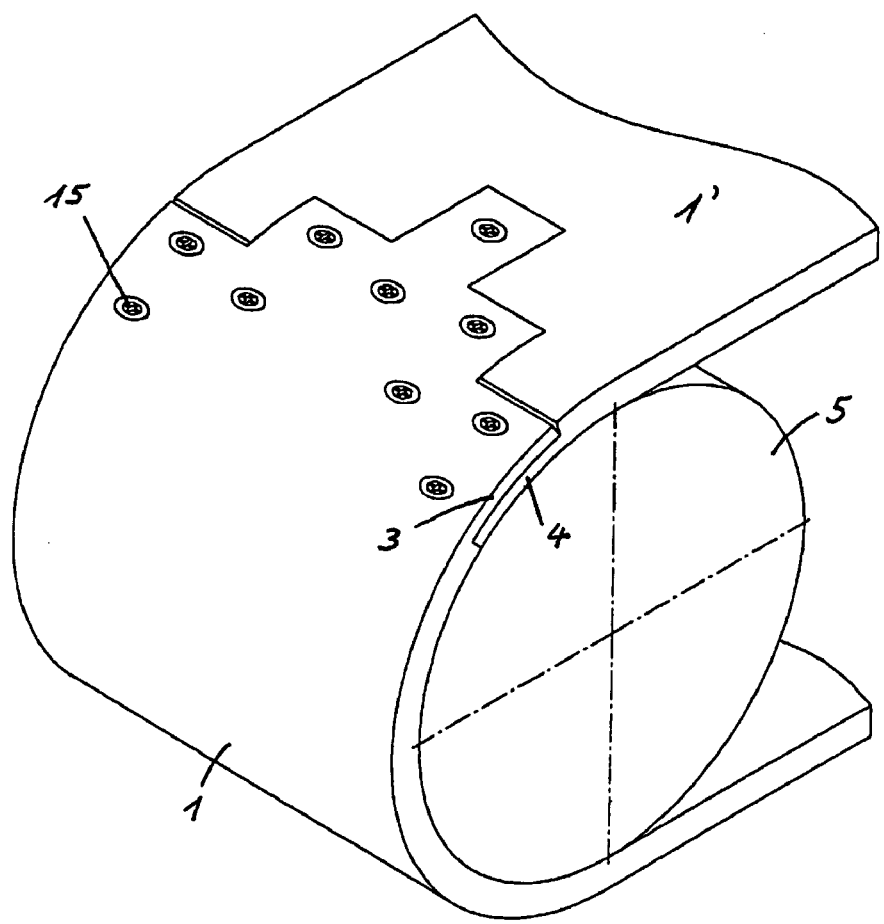
FIG. 2 shows a perspective view of another embodiment of a junction according to the invention and of the ends of a conveyor belt, in place on a driving roller.

FIG. 2 shows another more elaborate junction according to the invention, in the same position as the junction in FIG. 1. It is remarkable that the front edge of the male half-junction 3 has sections that are shifted in the longitudinal direction, which make it possible to prevent any possible catching of the scrapers over too considerable a section of the width at the same time.

Figure 3:
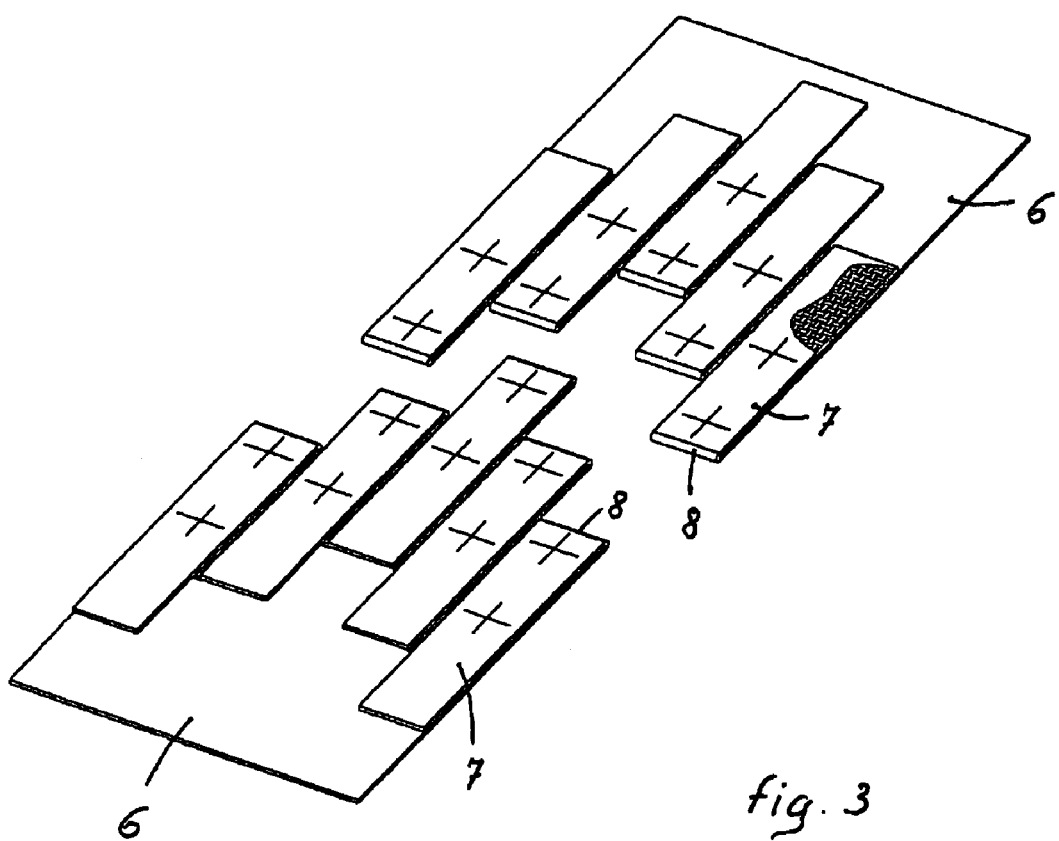
FIG. 3 shows, in a perspective view, sections of the core folded with a view to being included in the half-junctions with matching shapes according to the invention.

FIG. 3 shows a perspective view of the folded sections of the core 7, which are folded over the cores 6 level with the longitudinally shifted folds 8 coming from the ends of the conveyor belt (not shown), the cores being slit longitudinally to allow said shifting.

FIG. 4 shows, in a diagrammatic longitudinal section view, the elements of the half-junctions: the cup inserts 13, the top layer of constituent material 10, the folded cores 6, 7, the folds 8, the bottom layers of constituent material 11, a thin intermediate layer 12 between the folded cores 6, 7 of the two half-junctions, the bush inserts 14, their bushes 14", their flanges 14', the screws 15 used for assembly being shown inside the cup inserts 13.

FIGS. 5*a* and 5*b* show the same elements, with the same numerical references, the cup inserts and the bush inserts being held inside the vulcanised layers of the vulcanised material and the core, the half-junctions being ready for assembly in FIG. 5*a* and assembled in FIG. 5*b*.

Figure 6:
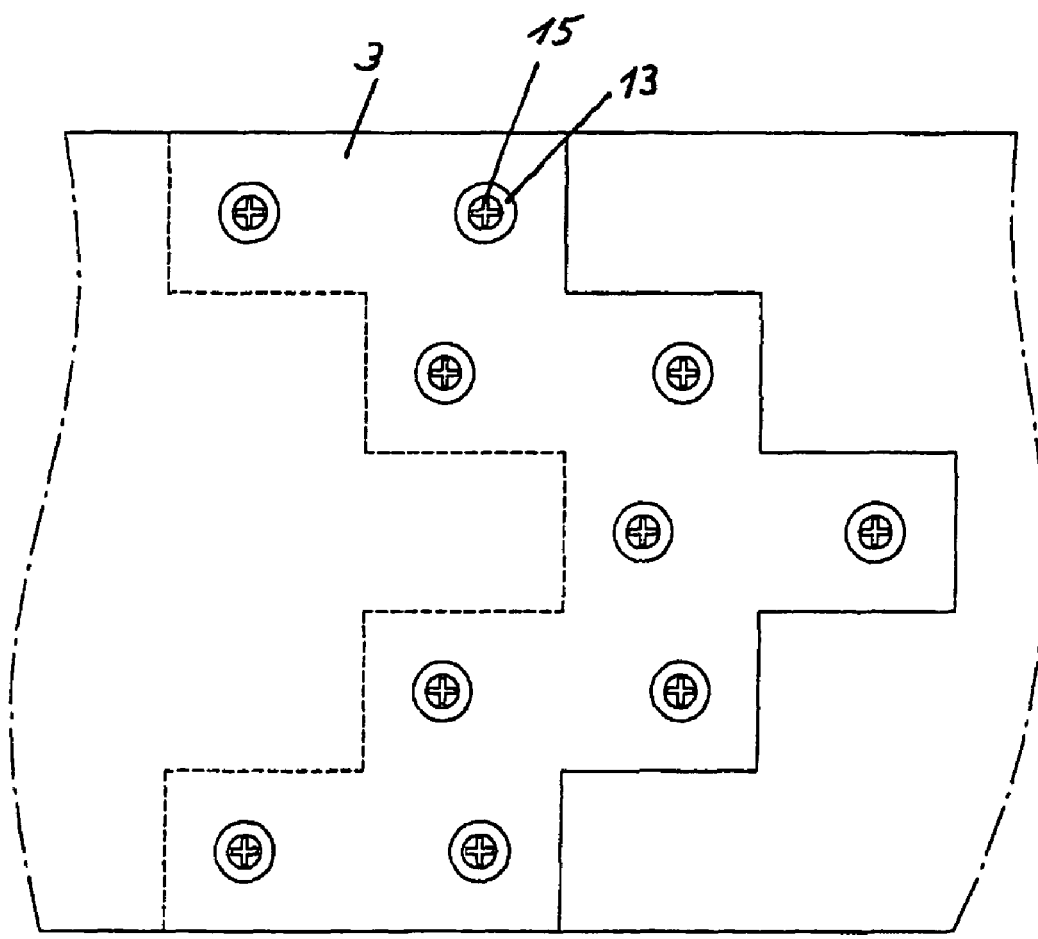
FIG. 6 shows, in an outline sketch, one embodiment of the junction according to the invention in the assembled stage, in which the shape matches that of the folded cores of FIG. 3.

In FIG. 6, which shows an outline sketch of an assembled junction, the top surface of the male half-junction 3 is shown, as are the screws 15 and the cup inserts 13.

Figure 7:
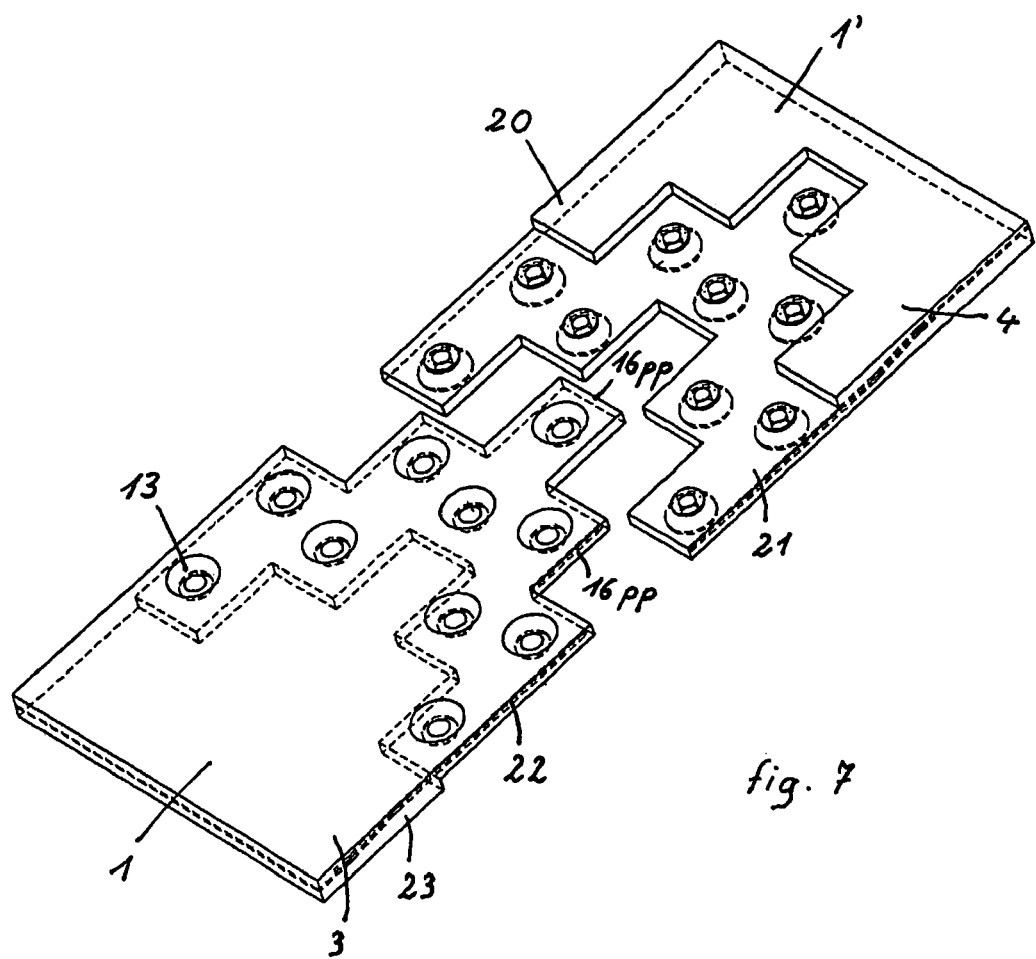
FIG. 7 shows, in a perspective view, the embodiment of the invention shown in FIG. 6, with the two half-junctions still separated.

FIG. 7, which shows a perspective view of one embodiment, remarkably shows front edge sections 16*pp* that are perpendicular to the longitudinal direction of the male half-junction 3, front edge sections 16*pl* that are parallel to the longitudinal direction of the male half-junction 3, a top level 22 of the male half-junction 3, a bottom level 23 of the male half-junction as well as the side of the female half-junction 4 with a shape that matches that of the male half-junction 3, the top 20 and bottom 21 levels of the female half-junction and, finally, the connecting ends 1, 1'.

Figure 8:
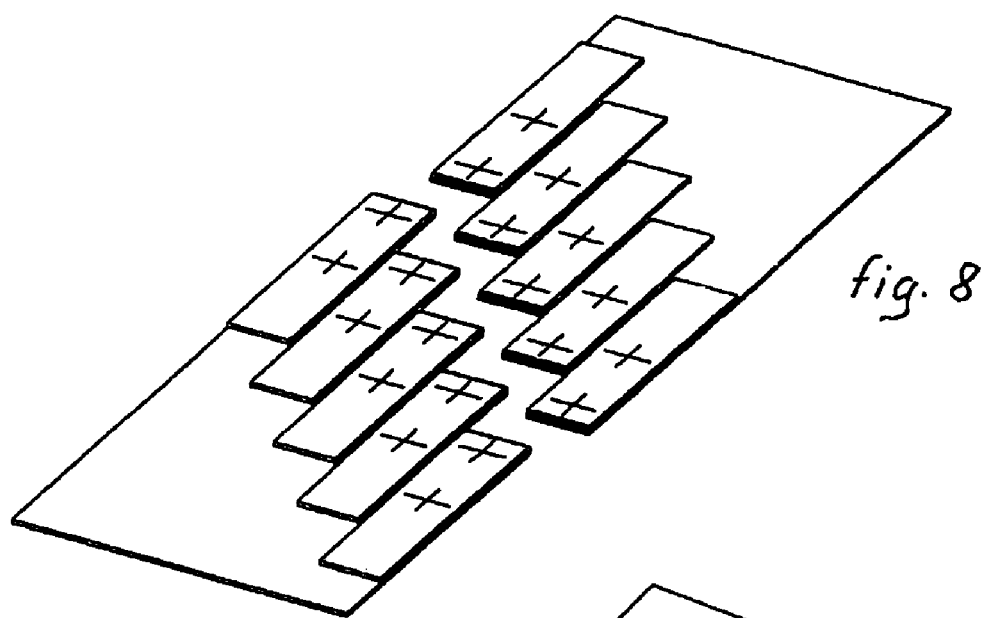
FIGS. 8 and 9 show folded core sections corresponding to other embodiments of the half-junctions according to the invention.
Figure 9:
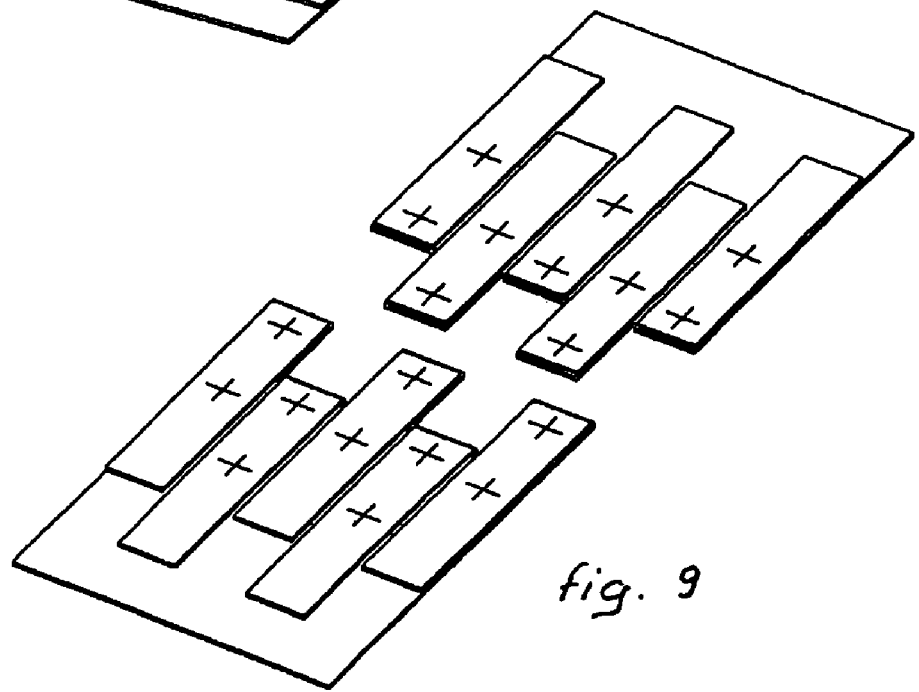

FIGS. 8 and 9 show two other ways of folding the cores, which respectively correspond to two other shapes of the front edge that are related to that shown in FIG. 3.

Figure 10:
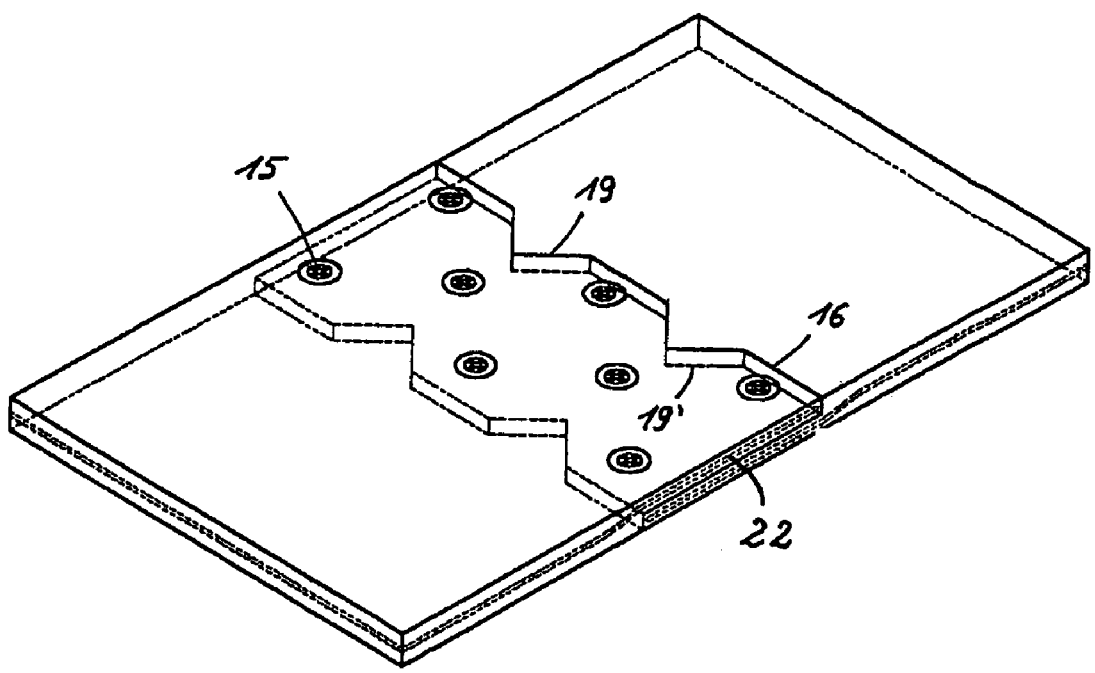
FIG. 10 is a perspective view of yet another embodiment of the junction according to the invention.

FIG. 10 shows a perspective view of another embodiment of the invention.

Figure 11:
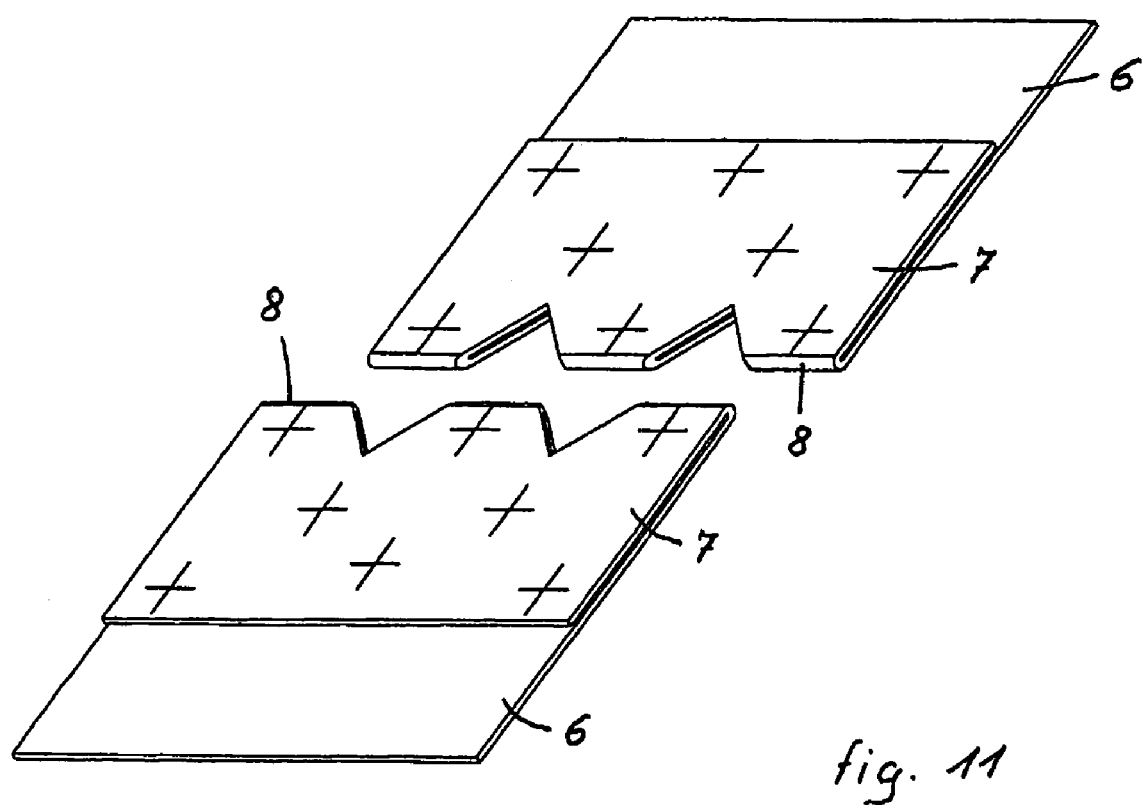
FIG. 11 is a perspective view of cores folded and indented with a view to be added to a junction according to FIG. 10.

FIG. 11 shows the folded cores, which correspond to the embodiment of the invention shown in FIG. 10. In this embodiment, shown completed and assembled in FIG. 10, the front edge 16 of the top level 22 of the male half-junction 3 is overall perpendicular to the longitudinal direction, with the exception of two V-shaped indentations 19, 19' made so that the point of the V is pointing towards the rear. A matching shape can be seen in FIG. 11, the core being folded and indented according to a shape identical to that of the completed front edge and being located to the rear in the completed male half-junction. The drawing only shows two V-shaped indentations but, depending on the width of the end of the conveyor belt, it is obviously possible to provide only one or more than two V-shaped points. The edge of the top level of the female half-junction, the constituent material of which is a continuation of that of the end of the corresponding conveyor belt, has a shape that matches that of the front edge of the top level of the male half-junction 3.

The perforations appearing at both the front edge of the bottom level of the female half-junction 4 and the front edge of the bottom level of the male half-junction 3 are notable. Likewise, the edge of the bottom section of the male half-junction in which the constituent material is a continuation of that of the end of the matching conveyor belt has a shape that matches that of the front edge of the female half-junction. The assembly screws 15 are placed, as are the cup inserts and the bush inserts, over a distance that can be increased according to the particular shape of this embodiment of the invention, which means that a larger number of screws can be placed in both the longitudinal and transversal directions, increasing the dimensions of the male and female half-junctions in the longitudinal direction.

Figure 12:
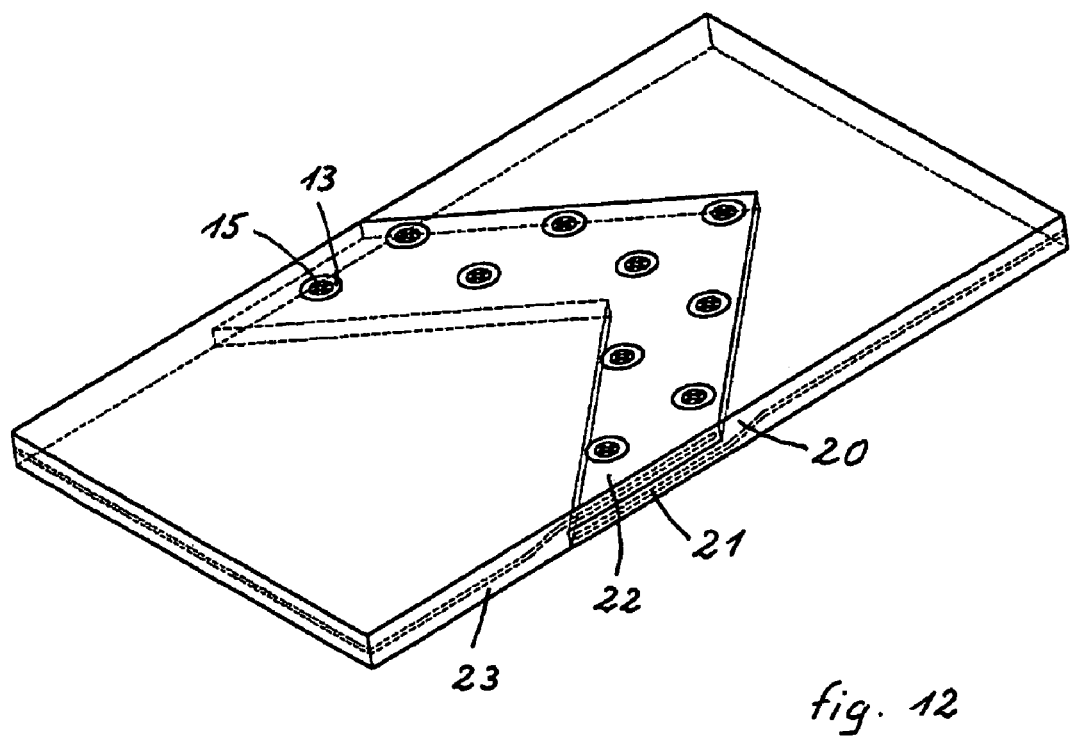
FIG. 12 is a perspective view of yet another embodiment of a junction according to the invention.

FIG. 12 shows yet another embodiment of the invention.

Figure 13:
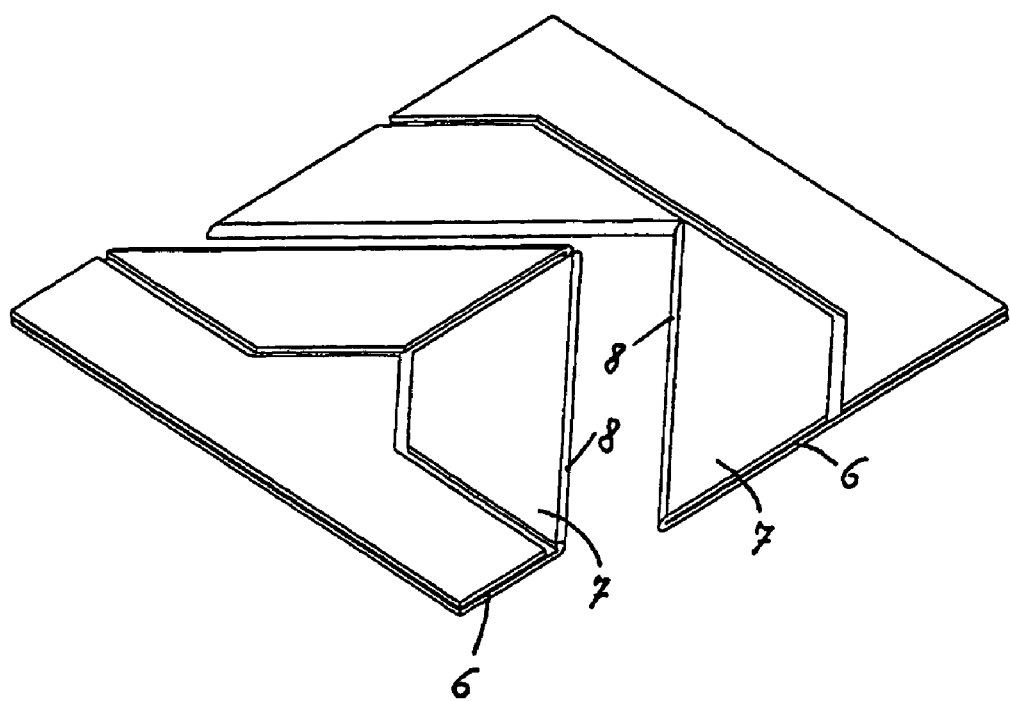
FIG. 13 is a perspective view of cores folded with the aim of being added to a junction according to claim 12.

FIG. 13 shows the folded cores that correspond to the embodiment of the invention shown in FIG. 12.

The front edge of the top level 22 of the male half-junction is notably seen in the shape of a V in an outline sketch, with the point of the V pointing towards the front, the shapes of the front edges of the bottom level 23 of the male half-junctions 3 in which the constituent material is a continuation of that of the corresponding half end, and of the top level 20 of the female half-junction 4 in which the constituent material is a continuation of that of the corresponding half end, resulting from the shape of the front edge of the top level 22 of the male half-junction 3 as defined previously.

Figure 14:
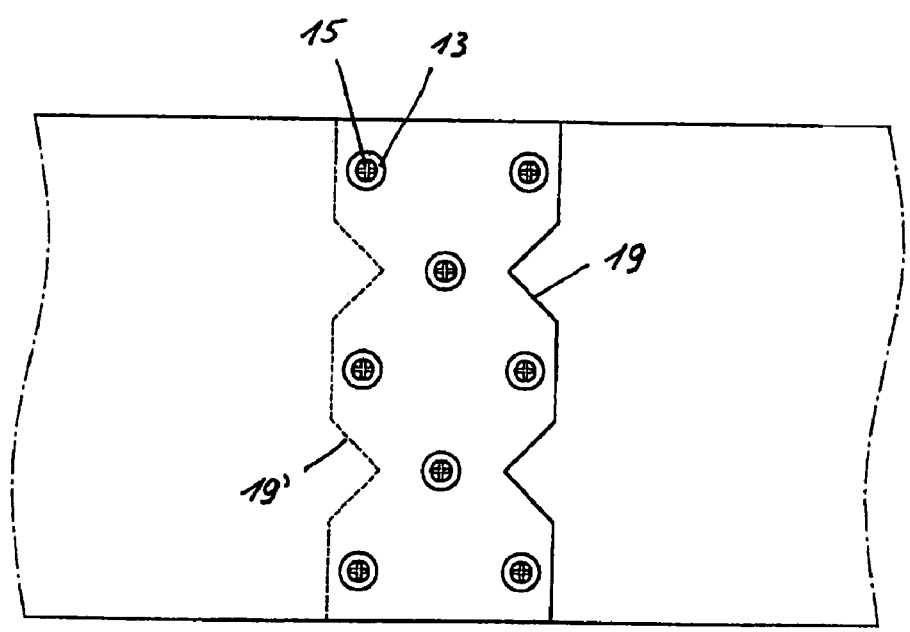
FIG. 14 shows an outline sketch of the junction according to FIG. 10.

FIG. 14 shows the screws 15, the cup inserts 13 and the indentations 19, 19' of the junction of FIG. 10, in an outline sketch.

Figure 15:
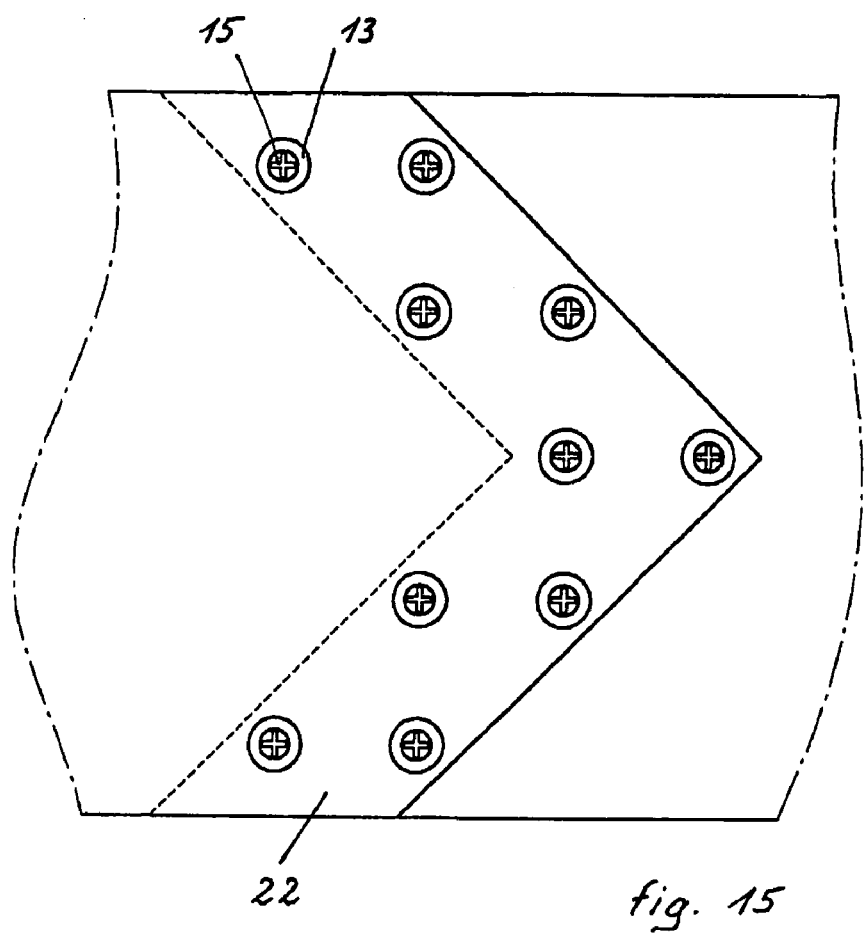
FIG. 15 shows an outline sketch of the junction according to FIG. 12.

FIG. 15 shows the cup inserts 13 and the V shape of the top level 22 of the male half-junction of FIG. 12, in an outline sketch.

Figure 16:
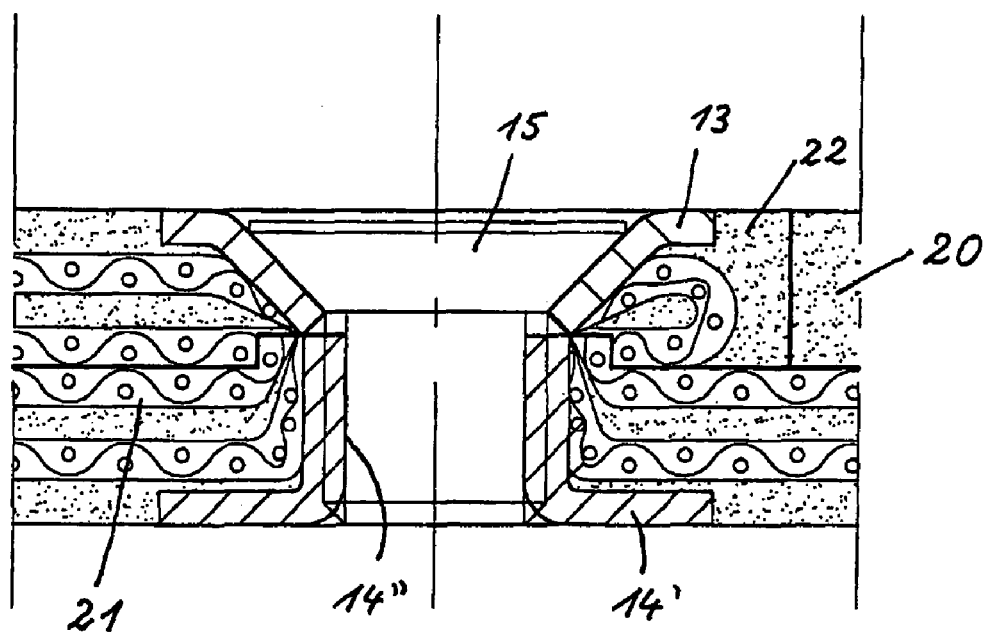
FIG. 16 shows, in an enlarged longitudinal section view, the screw-cup-insert-bush-insert assembly system and the insertion of a cup insert and a bush insert in the respective ends of a conveyor belt.

Finally, FIG. 16, which is an enlarged view of a longitudinal section view of the screw-cup-insert-bush-insert assembly system, shows the screw 15, the cup insert 13, the top level 22 of the male half-junction, the top level 20 of the female half-junction, the bottom level 21 of the female half-junction, the bush insert 14, its bush 14" and its flange 14'. Notably, each half-junction also shows the top folded layers and the bottom layers, said layers being lifted along the bush and lowered along the cup.

The present invention is described with the help of several embodiments acting as examples; it is not, however, limited to the examples shown and described. Its scope extends to the contents of the claims, supported by the complete text of the description section.

The invention claimed is:

1. A conveyor belt, comprising:
first and second ends; and
first and second half-junctions at said first and second ends, respectively, the first and second half-junctions being shaped to interlink with each other to form a junction, each of the first and second half-junctions having a generally flat shape defining a general plane of the junction, the first half-junction including:
an upper layer and a lower layer, each of the upper and lower layers being integral with the first end of the conveyor belt,
a flexible core extending between the upper layer and the lower layer, the flexible core being folded so as to provide overlapping layers that form a fold protruding towards the second end of the conveyor belt parallel to the general plane of the junction, the upper layer and the flexible core being closer to the second end of the conveyor belt than the lower layer, and
inserts extending through the upper layer and the overlapping layers of the flexible core perpendicularly to the general plane of the junction, the inserts of the first half junction being spaced from the lower layer, and
the second half-junction including:
a lower layer and an upper layer, each of the lower and upper layers being integral with the second end of the conveyor belt,
a flexible core extending between the lower layer and the upper layer, the flexible core being folded so as to provide overlapping layers that form a fold protruding towards the first end of the conveyor belt parallel to the general plane of the junction, the lower layer and the flexible core being closer to the first end than the upper layer, and
inserts extending through the lower layer and the overlapping layers of the flexible core perpendicularly to the general plane of the junction, the inserts of the second half-junction being spaced from the upper layer,
wherein the flexible core of one of the first and second half-junctions overlaps the flexible core of the other one of the first and second half-junctions at the junction, and the upper layer of each one of the first and second half-junctions is arranged end-to-end with the upper layer of the other one of the first and second half junctions at the junction.

2. A conveyor belt according to claim 1, wherein the front edge of the top level of the first half-junction has a succession of front edge sections perpendicular to the longitudinal direction of the first half-junction, separated from each other in the longitudinal direction and front edge sections that extend longitudinally, each of these front edge sections perpendicular to the longitudinal direction being connected to the closest front edge sections that are perpendicular to the longitudinal direction shifted towards the rear by front edge sections that are parallel to the longitudinal direction, thus forming a broken line, the shapes of the front edge of the bottom level of the first half-junction, of the front edge of the top level of the second half-junction and of the front edge of the bottom level of the second half-junction resulting, as defined above, from the shape of the front edge of the top level of the first half-junction, the core being slit longitudinally over the distances required to form shifted folds and the shifted folded sections corresponding to the shifted front edge sections.

3. A conveyor belt according to claim 2, wherein the front edge of the first half-junction is in the shape of a broken line arranged overall obliquely across the first half-junction.

4. A conveyor belt according to claim 2, wherein the front edge of the first half-junction, is in the shape of a broken line arranged in an overall V shape, the point pointing towards the front.

5. A conveyor belt according to claim 2, wherein the front edge of the first half-junction alternately comprises first front edge sections perpendicular to the longitudinal direction and second front edge sections perpendicular to the longitudinal direction shifted towards the rear in relation to the first front edge sections.

6. A conveyor belt according to claim 1, wherein the front edge of the top level of the first half-junction is in the shape of a V with its arms forming straight lines, the point of the V pointing towards the front, the shapes of the front edge of the bottom level of the first half-junction, of the front edge of the top level of the second half-junction and of the front edge of the bottom level of the second half-junction resulting from the shape of the front edge of the top level of the first half-junction, and the folds of the cores being arranged obliquely in relation to the longitudinal direction, following the arms of the V of the shape of the front edges towards the rear.

7. A conveyor belt according to claim 1, wherein the front edge of the top level of the first half-junction is substantially perpendicular to the longitudinal direction, with the exception of one or more V-shaped indentations, the point of the V pointing towards the rear, the core being indented following the shape towards the rear of the indentations of the front edges of the top level of the first half-junction, the shapes of the front edges of the bottom level of the first half-junction and of the top level and of the bottom level of the second half-junction resulting from the shape of the front edge of the top level of the first half-junction, and the core of the bottom level of the second half-junction being indented following the shape of the indentations of the front edge of this bottom level of the second half-junction towards the rear.

8. A junction for a conveyor belt according to claim 1, wherein the first and second half-junctions are formed of vulcanized rubber or plastic.

9. A junction for a conveyor belt according to claim 1, wherein the fasteners are one of a screw, rivet, or stud.

10. A conveyor belt according to claim 1, wherein
the inserts of the first and second half-junctions include cup inserts and bush inserts allowing the passage of assembly rods.

11. A conveyor belt according to claim 10 wherein
each of the assembly rods extends through one of the inserts of the first half-junction and through one of the inserts of the second half-junction without protruding from the junction.

12. A conveyor belt according to claim 10, wherein the bush inserts are made in the second half-junctions so that the bush inserts drive the edges of the hole of the two cores that surround the bush inserts perpendicularly in the general plane thereof and are therefore solidly attached to the second half-junction in two perpendicular planes.

13. A conveyor belt according to claim 12, wherein the bush inserts comprise a section forming a flat flange that is attached to the actual bush section and arranged perpendicularly to the end of the bush that is the closest to the outside surface of the bottom level of the matching second half-junction, only being separated from this surface by a thin layer of a constituent material, these flanges extending in a plane that is parallel to the general plane of the second half-junction and being solidly attached to the constituent material that surrounds them.

14. A conveyor belt according to claim 13, wherein the cup inserts are made in the first half-junctions so that the cup rests closely, by its sections that border the central hole, against the edges of the hole made in the two cores, with which it is attached by the surrounding constituent material.

15. A conveyor belt according to claim 1, wherein
the junction and each half-junction have a maximum thickness that is equal to or slightly less than that of the ends of the conveyor belt.

* * * * *